Patented Mar. 15, 1932

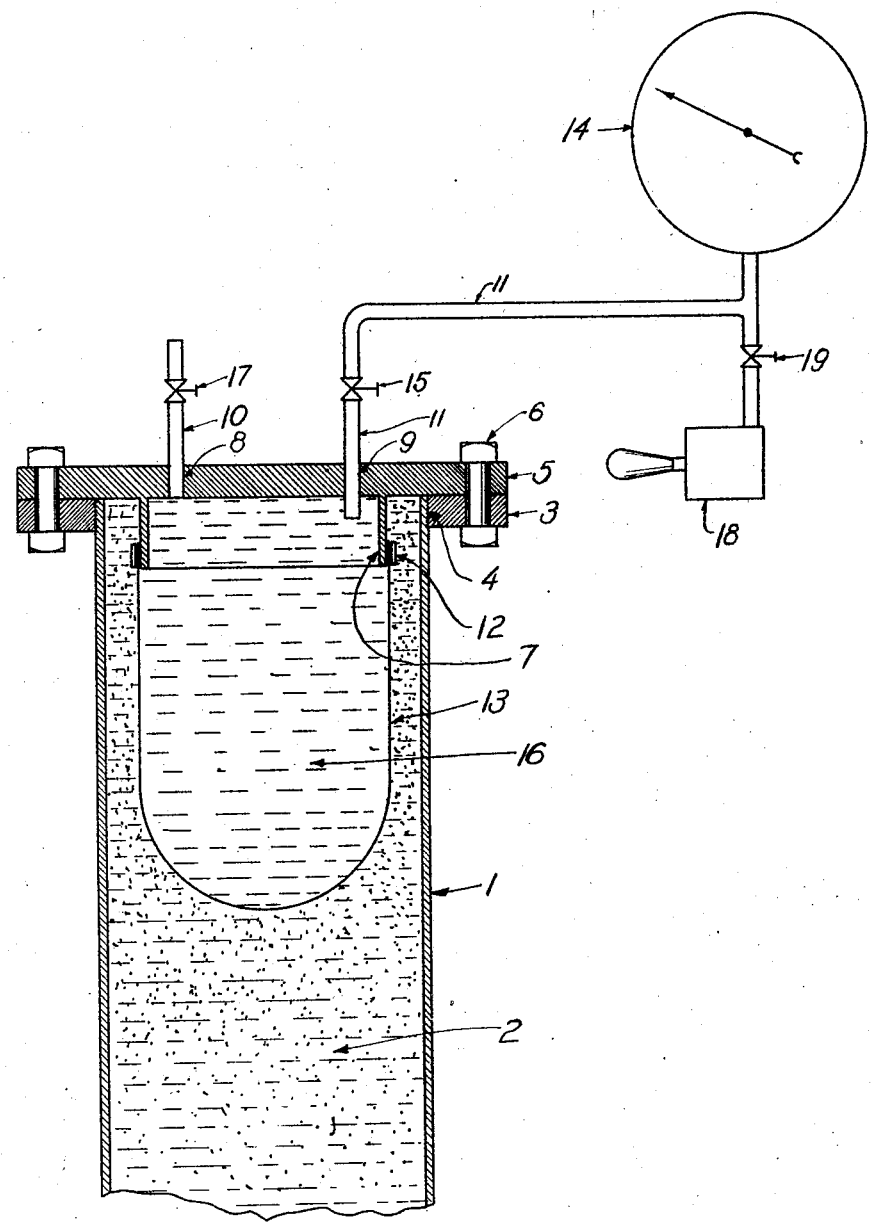

1,849,137

UNITED STATES PATENT OFFICE

DON G. DAWKINS, OF LOS ANGELES, CALIFORNIA

ROTARY DRILL PRESSURE GAUGE PROTECTOR

Application filed June 24, 1927. Serial No. 201,142.

My invention is designed to protect pressure gauges, particularly those of the Bourdon spring type, against inaccuracy and injury when used to indicate the pressure of liquids containing solid matter in suspension.

My invention has especial reference to gauges indicating pressure on mud-laden fluid, such as the circulating mud used in rotary well drilling.

When pressure gauges are used in direct communication with mud-laden fluid, silt and sand will gradually work into the coiled flat tube of a Bourdon gauge, reducing or destroying its accuracy. Also, small leaks are inevitable in piping subjected to the vibration of a rotary drilling rig, and such leaks will usually be small enough to allow the water and very fine suspended particles to escape but will retain the larger grains. As there is no circulation through the small pipe connecting the gauge to the mud line, this pipe will eventually choke and the gauge go out of commission.

By the use of my protecting device, all solids are kept out of the gauge and its connections and fouling of gauges and connecting pipes is positively prevented.

A preferred embodiment of my invention is illustrated in the attached drawing, in which the figure shows the complete assembly.

Referring to the figure, 1 is a pipe of relatively large diameter, either a branch of the circulating line or a stub on the discharge header connecting the two circulating pumps. During operation this pipe is full of circulating mud, as indicated at 2.

3 is an ordinary pipe flange attached to pipe 1 by threads 4, and to a special blind flange 5 by bolts 6. On the lower side of this flange and extending a short distance (as for instance, an inch) into pipe 1, is formed an annular ring 7 of a materially smaller diameter than pipe 1. A flexible sack or diaphragm 13 completely closes the open end of the ring 7 and is securely fastened to this ring, as by a clamping ring 12.

An air venting pipe 10 controlled by valve 17 is screwed into the threaded hole 8, located anywhere within ring 7. The pressure gauge 14 communicates with any point within ring 7 through pipe 11 screwed into threaded hole 9 and controlled by valve 15. This pipe preferably extends a short distance through the blind flange 5, to form a separating space for air, but should not extend to the level of the edge of ring 7.

The hand pump 18 communicates with pipe 11 through the pipe and valve 19.

The flexible diaphragm 13 may be of the form shown or of any other convenient form, ranging from a long narrow tube closed at its lower end to a plane sheet drawn over the edges of the ring 7. Its purpose is to exclude solids from the pressure gauge and to form a reservoir for clear liquid, and it is preferable that its cubic capacity should not be too limited. This diaphragm must be flexible but is not necessarily porous. A preferred material is a close grained filter cloth such as Parma twill, but ordinary canvas will answer the purpose and it may, if preferred, be made of rubber, of composition or even of flexible corrugated metal. The reason for preferring twill or canvas is that it is permeable to water which is, of course, the normal fluid constituent of drilling mud.

In operating my protector, the pipes 19 and 11 and the space 16 inside the diaphragm are filled with oil, clear water or other preferred liquid by means of the hand pump 18, the valves 19 and 15 being open and the air contained in the system being permitted to escape by opening the valve 17. When the system is filled with the clear liquid the valves 19 and 17 are closed and, pressure being applied by the circulating fluid 2 to the flexible diaphragm, is transmitted through the liquid contained therein to the gauge 14. In case of leakage from any of the connections, tending to partially collapse the diaphragm (which will become coated on its outer side with mud and thereby rendered impervious to the passage of liquid from the outside) its original shape may be reestablished by opening the valve 19 and giving a few strokes of the hand pump 18, which draws clear liquid from any convenient source of supply, not shown. Any over-supply of clear liquid thus pumped in will readily displace at least some portion of the mud caked on the outside of the diaphragm and will thus escape into pipe 1. The gauge is thus at all times in communication only with clear liquid, obviating any chance of injury to the gauge or its connecting pipe 11.

While I have described a complete embodiment of my invention, I do not limit myself to the specific construction shown, my invention being defined and limited solely by the attached claims.

I claim as my invention:

1. In a protector for pressure gauges; a reservoir for containing clear liquid, a means of communication between said reservoir and said gauge, said reservoir comprising a water permeable, strong, closely woven cloth diaphragm separating said clear liquid from the liquid of which the pressure is to be indicated, a pump for forcing clear liquid into said reservoir, and a means for venting air from said reservoir.

2. A protector for a Bourdon spring pressure gauge indicating the pressure in a pipe conveying a muddy liquid, said protector comprising: a substantially rigid tubular closed vessel communicating with the interior of said pipe and adapted to contain muddy liquid under pressure, one end of said vessel being detachable; a completely collapsible reservoir adapted to contain clear liquid and to receive and transmit the pressure of said muddy liquid to said gauge without admitting mud thereto, said reservoir consisting of an open ended sack of flexible closely woven, strong cloth substantially permeable to water but not to clay particles, located within said vessel, said open end being nonleakably attached to the interior surface of said detachable end of said vessel; means of communication between the interior of said reservoir and said gauge, and means for forcing clear liquid into said reservoir to distend said reservoir when collapsed.

3. A protector for a Bourdon spring pressure gauge indicating the pressure in a pipe conveying a muddy liquid, said protector comprising: a substantially rigid tubular closed vessel communicating with the interior of said pipe and adapted to contain muddy liquid under pressure, one end of said vessel being detachable; a completely collapsible reservoir adapted to contain clear liquid and to receive and transmit the pressure of said muddy liquid to said gauge without admitting mud thereto, said reservoir consisting of an open ended sack of flexible material permeable to the clear constituent of said muddy liquid and impermeable to the solid constituent thereof, located within said vessel, said open end being nonleakably attached to the interior surface of said detachable end of said vessel; means of communication between the interior of said reservoir and said gauge, and means for forcing clear liquid into said reservoir to distend said reservoir when collapsed.

In witness that I claim the foregoing I have hereunto subscribed my name this 11 day of June, 1927.

DON G. DAWKINS.